Jan. 8, 1929.

A. A. MAGAZZU 1,698,411

METHOD OF AND APPARATUS FOR MAKING SPUMONI AND THE LIKE

Filed Feb. 21, 1927       2 Sheets-Sheet 1

Inventor:
Anthony A. Magazzu,
By Jas. C. Wobuswith
Attorney.

Jan. 8, 1929. 1,698,411
A. A. MAGAZZU
METHOD OF AND APPARATUS FOR MAKING SPUMONI AND THE LIKE
Filed Feb. 21, 1927 2 Sheets-Sheet 2
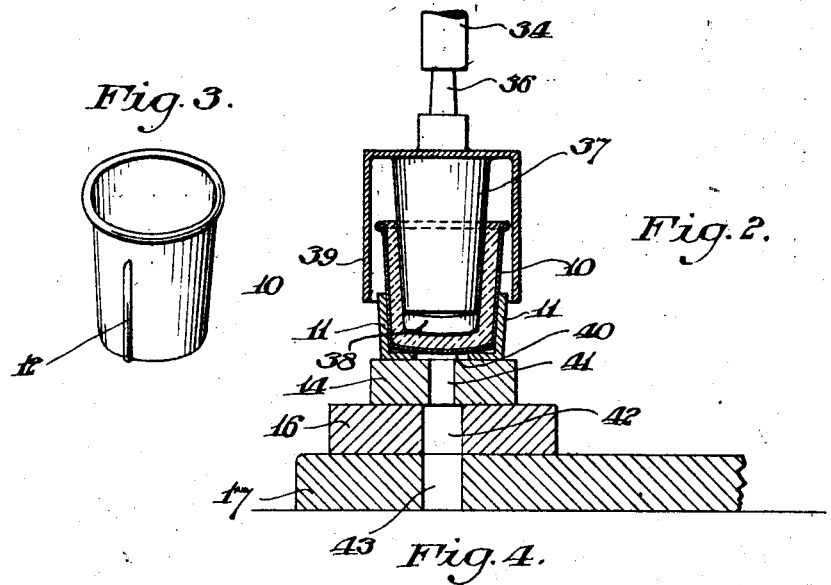
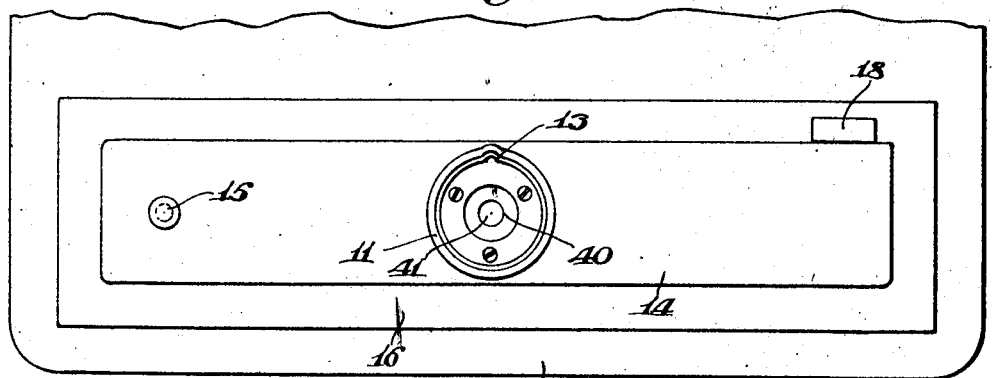
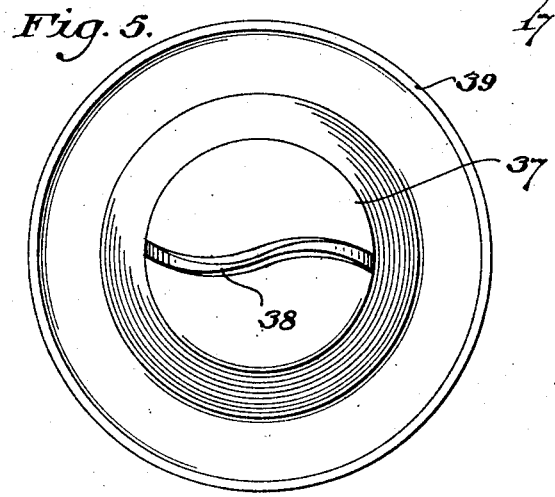
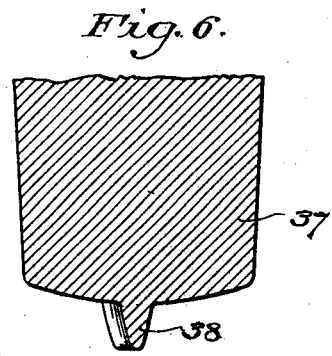
Inventor:
Anthony A. Magazzu,
By Jas. C. Nobesmith
Attorney Patented Jan. 8, 1929.

1,698,411

UNITED STATES PATENT OFFICE.

ANTHONY A. MAGAZZU, OF UPPER DARBY TOWNSHIP, DELAWARE COUNTY, PENNSYLVANIA.

METHOD OF AND APPARATUS FOR MAKING SPUMONI AND THE LIKE.

Application filed February 21, 1927. Serial No. 170,049.

My invention relates to a method of and apparatus for making spumoni and the like. For the information of those not familiar with this product, it may be stated that spumoni comprises a composite cake of ice cream, the central portion of which is customarily made up of layers of vari-flavored ice cream and custards, which central portion is enclosed in an outer layer of ice cream of preferred flavor, French vanilla being the flavor usually employed for this outer coating.

In the customary method of making spumoni, frusto-conical cup-like molds are provided, into each of which a quantity of the ice cream comprising the outer layer is placed, the same being then worked up by the fingers of the operator around the side walls of the mold, after which the several portions of the vari-flavored ice cream which make up the central portion is placed in the interior of the lined mold, the whole being then permitted to set in the mold at the proper temperature until wanted for delivery or use. In dispensing the product to the ultimate customer, the same is usually cut into wedge-shaped sections.

The method of making spumoni as hereinbefore outlined is objectionable in that the ice cream forming the coating is manipulated by the hands of the operator to line the walls of the mold, this practice being obviously objectionable and insanitary. Furthermore, by the employment of this method, it is not possible to make the spumoni in a relatively small size, and frequently losses occurred in the restaurants where the product was dispensed by reason of the same melting and losing its attractive appearance when a considerable period of time elapsed between successive orders for portions of the same.

The object of my present invention is to provide an improved method of and apparatus for making spumoni and the like, which will be more sanitary than the method at present employed, which will not only be adapted for making the product in the customary sizes, but also in smaller or individual sizes, which will enable the product to be made more expeditiously, thereby materially reducing the labor cost, which will result in the outer layer of ice cream being shaped more uniformly, and which will permit the outer layer to be made much thinner than heretofore, if desired.

With the foregoing object in view, my present invention contemplates an improved method and a novel apparatus whereby a quantity of ice cream which is to form the outer layer of the spumoni may be readily and expeditiously manipulated to form the same around the interior of the walls of the cup-like mold.

The nature and characteristic features of my invention will be more readily understood from the following description, taken in connection with the accompanying drawings forming part hereof, in which:

Fig. 2 is a transverse section taken approximately on the line 2—2 of Fig. 1, the forming member, however, being shown in its lowermost or operative position;

Fig. 3 is a perspective view of one of the molds, showing means for preventing rotation thereof with respect to the mold holder;

Fig. 4 is a horizontal plan view of the bed portion of the apparatus;

Fig. 5 is an enlarged underneath plan view of the forming member; and

Fig. 6 is an enlarged transverse section of the lower end of the core portion of the forming member.

Figure 1:
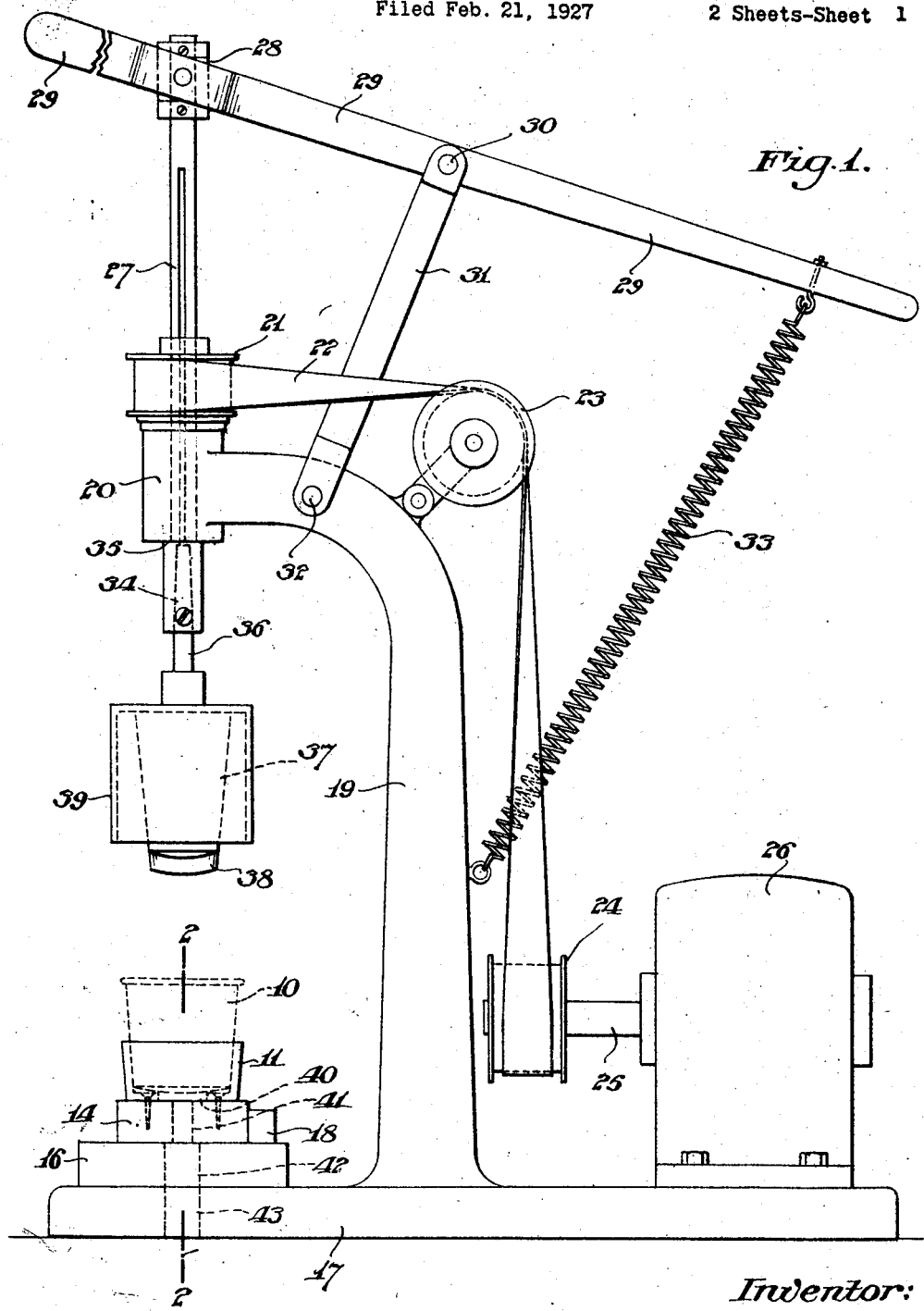
Figure 1 is a side elevation of apparatus embodying the main features of my present invention, and for the purpose of carrying out the method thereof.

Referring to the drawings, in the particular embodiment of my invention therein shown, 10 is a mold, preferably frusto-conical in shape, in which the spumoni is made. 11 is a mold holder complemental in shape to the lower end of the mold. The mold may be provided with one or more ridges 12, formed in the side walls thereof, and the mold holder may be provided with complemental grooves 13, for the purpose of preventing rotation of the mold with respect to the mold holder. The ridges 12 and grooves 13 may, however, be omitted in some instances, as it will ordinarily be found that the frictional engagement of the outer surface of the mold with the mold holder will be sufficient to prevent rotation.

The mold holder is mounted on a plate 14, which is pivoted by means of a bolt 15 to another plate 16, which plate 16 is secured to the bed plate 17 of the machine proper. Near the end of the plate 16, remote from the pivot 15, there is provided a stop member 18, against which the end portion of the plate 14 is adapted to abut when the plate 14 is in the operative position.

Projecting upward from the bed plate 17 is a standard 19, the upper end of which extends forward and is provided with a bearing portion 20, with respect to which a pulley 21 is journaled with its axis vertically disposed. The pulley 21 is rotated by means of a belt 22 which extends over idler pulleys 23 to a pulley 24. The pulley 24 is mounted on the shaft 25 of an electric motor 26 of any ordinary type.

A vertical spindle 27 extends through the pulley 21 and through the bearing portion 20 of the standard 19. The spindle 27 is feathered or splined with respect to the pulley 21, so that said spindle may be rotated by the pulley 21 and at the same time be vertically movable with respect thereto. The upper end of the spindle 27 is provided with a trunnioned collar 28, which is engaged by means of a hand lever 29 for the purpose of depressing the spindle 27 in the manner and for the purpose to be hereinafter set forth.

The hand lever 29 is pivoted as at 30 to one end of a link 31, the other end of which is pivoted as at 32 to a portion of the standard 19. To the rear end of the lever 19 there is connected one end of a coil spring 33, the other end of which is connected to a stationary portion of the machine, such as the standard 19. The spring 33 normally tends to depress the rear end of the hand lever 29, and consequently raise the spindle 27 to its upper inoperative position. The lower end of the vertical spindle 27 is provided with an enlarged portion 34, thereby providing a shoulder 35 which serves to limit the upward movement of the spindle 27.

The lower enlarged portion 34 of the spindle 27 is provided with a tapered socket for the reception of the complementally tapered shank 36 of the forming member. The forming member comprises a central core 37, preferably tapered, and of such size and shape as to form the ice cream contained within the mold in the manner which will be hereinafter more fully set forth. The lower end of the core portion of the forming member is provided with a rib 38, extending transversely across the bottom of the core portion 37 in reverse curvature, as shown in Fig. 5 of the drawings.

Surrounding the core portion 37 of the forming member is a skirt 39, which, when the spindle 27 is in its lowermost position, will extend downward over the outside of the mold 10 which is mounted in the mold holder 11.

The mold holder is provided in the bottom portion thereof with an opening 40, and likewise the pivoted plate member 14 is provided with an aperture 41, which registers with the opening 40 in the bottom of the mold holder 11. In like manner, the plate 16 and the bed 17 of the machine are provided with apertures 42 and 43. The aperture 41 in the pivoted plate member 14 registers with the aperture 42 in the plate member 16 when the pivoted plate member is in the operative position. By means of these apertures, drainage of the mold holder will be permitted when any of the ice cream becomes lodged and melts within the mold holder 11.

The operation of the machine above described, as well as the various steps constituting the method of my present invention, may now be explained. The motor 26 being supplied with current, the same will, by means of the pulley 24, belt 22 and pulley 21, rotate the spindle 27 constantly. The spindle 27 will normally be held in the elevated position by means of the spring 33 and lever 29, and consequently the forming member will normally be held in the uppermost position, but will be constantly rotated as above set forth.

The plate 14 is swung outward about its pivot 15, thereby to enable a mold (containing a suitable quantity of ice cream) to be readily placed in the mold holder 11. The plate 14 is now swung into its operative position, the lug 18 serving to limit the movement of the same whereby the mold holder, with the mold contained therein, is brought directly beneath the forming member.

The operator now manually depresses the projecting end of the hand lever 29, thereby causing the rotating forming member to be brought into operative relationship with the mold and the ice cream contained therein. As the rotating forming member descends into the interior of the mold 10, the curved rib 38, which is provided on the lower end of the core portion 37 of the forming member, will cause the ice cream to be so manipulated as to be formed upward around the interior of the walls of the mold, and this without unduly compressing the ice cream and changing its texture, as would be the case should an attempt be made to force the ice cream upward around the side walls of the mold by the insertion of a simple plunger. The skirt portion 39 of the forming member will serve to prevent the throwing outward of any excess of ice cream which may be contained within the mold, and will cause the same to pile up above the upper rim of the mold, so that loss of the same will be prevented, and the portion of the room surrounding the apparatus will be kept in a sanitary condition.

Having thus described the nature and characteristic features of my invention, what I claim as new and desire to secure by Letters Patent, is:

1. The method of making spumoni and the like which consists of placing a measured quantity of ice cream in a cup-like mold, then inserting a core into said mold, then advancing said core into the mold, and simultaneously rotating said core, thereby to cause the ice cream to be formed around the interior of the walls of the mold.

2. The method of making spumoni and the like which consists of placing a measured quantity of ice cream in a cup-like mold, then inserting a core into said mold, then advancing said core into the mold, and simultaneously rotating said core, and agitating the ice cream at the end of the core, thereby to cause the ice cream to be formed around the interior of the walls of the mold.

3. Apparatus of the character described comprising a cup-shaped mold adapted to receive a measured quantity of ice cream, a mold holder having its interior shaped complemental to a portion of the exterior of the mold, a forming member having a core portion adapted to enter the mold and form the ice cream around the side walls thereof, a rib on the lower end of the core portion extending across the same in reverse curvature, the forming member having a skirt portion adapted to be positioned around the outside of the mold, a vertical spindle at the lower end of which the forming member is mounted, said spindle being vertically movable, means for rotating said spindle, and means for lowering and raising said spindle comprising a hand lever operatively connected therewith, and a spring connected to a portion of said hand lever, said hand lever being adapted to be manually actuated in one direction by the operator and to be actuated in the other direction by the spring.

4. Apparatus of the character described comprising a cup-shaped mold adapted to receive a measured quantity of ice cream, a mold holder having its interior shaped complemental to a portion of the exterior of the mold, a forming member having a core portion adapted to enter the mold and form the ice cream around the side walls thereof, a rib on the lower end of the core portion extending across the same in reverse curvature, the forming member having a skirt portion adapted to be positioned around the outside of the mold, a vertical spindle at the lower end of which the forming member is mounted, said spindle being vertically movable, means for rotating said spindle, and means for lowering and raising said spindle.

5. Apparatus of the character described comprising a cup-shaped mold adapted to receive a measured quantity of ice cream, a mold holder, a forming member having a core portion adapted to enter the mold and form the ice cream around the side walls thereof, a rib on the lower end of the core portion extending across the same in reverse curvature, the forming member having a skirt adapted to be positioned around the outside of the mold, a vertical spindle at the lower end of which the forming member is mounted, said spindle being vertically movable, means for rotating said spindle, and means for lowering and raising said spindle.

6. Apparatus of the character described comprising a cup-shaped mold adapted to receive a measured quantity of ice cream, a mold holder, a forming member comprising a main body portion having a smooth exterior surface adapted to enter the mold and form the ice cream around the side walls thereof, a rib on the lower end of the body portion of the forming member extending across the same in reverse curvature, a vertical spindle at the lower end of which the forming member is mounted, said spindle being vertically movable, means for rotating said spindle, and means for lowering and raising said spindle.

7. Apparatus of the character described comprising a cup-shaped mold adapted to receive a measured quantity of ice cream, a mold holder, a forming member comprising a main body portion having a smooth exterior surface adapted to enter the mold and form the ice cream around the side walls thereof, a rib on the lower end of the body portion of the forming member, means for rotating said forming member, and means for lowering and raising said forming member.

8. Apparatus of the character described comprising a cup-shaped mold adapted to receive a measured quantity of ice cream, a mold holder, a forming member comprising a main body portion having a smooth exterior surface adapted to enter the mold and form the ice cream around the side walls thereof, the forming member having a skirt portion adapted to be positioned around the outside of the mold, means for rotating said forming member, and means for lowering and raising said forming member.

In testimony whereof I have hereunto signed my name.

ANTHONY A. MAGAZZU.